No. 866,879.
PATENTED SEPT. 24, 1907.

G. C. McGEE.
FLY TRAP.
APPLICATION FILED FEB. 18, 1907.

Witnesses
W. H. Rockwell
M. J. Miller.

Inventor
Guy C. McGee

By
Attorneys

THE NORRIS PETERS CO., WASHINGTON, D. C.

UNITED STATES PATENT OFFICE.

GUY C. McGEE, OF IRONTON, COLORADO, ASSIGNOR OF ONE-FOURTH TO A. G. BRUNER, OF IRONTON, COLORADO.

FLY-TRAP.

No. 866,879.      Specification of Letters Patent.      Patented Sept. 24, 1907.

Application filed February 18, 1907. Serial No. 357,950.

To all whom it may concern:

Be it known that I, GUY C. McGEE, a citizen of the United States, residing at Ironton, in the county of Ouray, State of Colorado, have invented certain new and useful Improvements in Fly-Traps; and I do hereby declare the following to be a full, clear, and exact description of the invention, such as will enable others skilled in the art to which it appertains to make and use the same.

This invention has relation to that class of fly-traps in which an endless traveling belt is employed to attract the flies to alight thereon and by which they are carried into a chamber where they are trapped and destroyed.

It is the object of my invention to provide an improved construction that will, in the first place, be simple in construction and mode of use and economical of manufacture, and that will be enhanced in efficiency and readiness of employment.

The nature of the invention may be ascertained from an inspection of the device portrayed in the annexed drawings, forming a part of this application, in view of which it will first be described in detail with respect to its construction and mode of operation and then be specifically pointed out in the claims.

Figure 1:
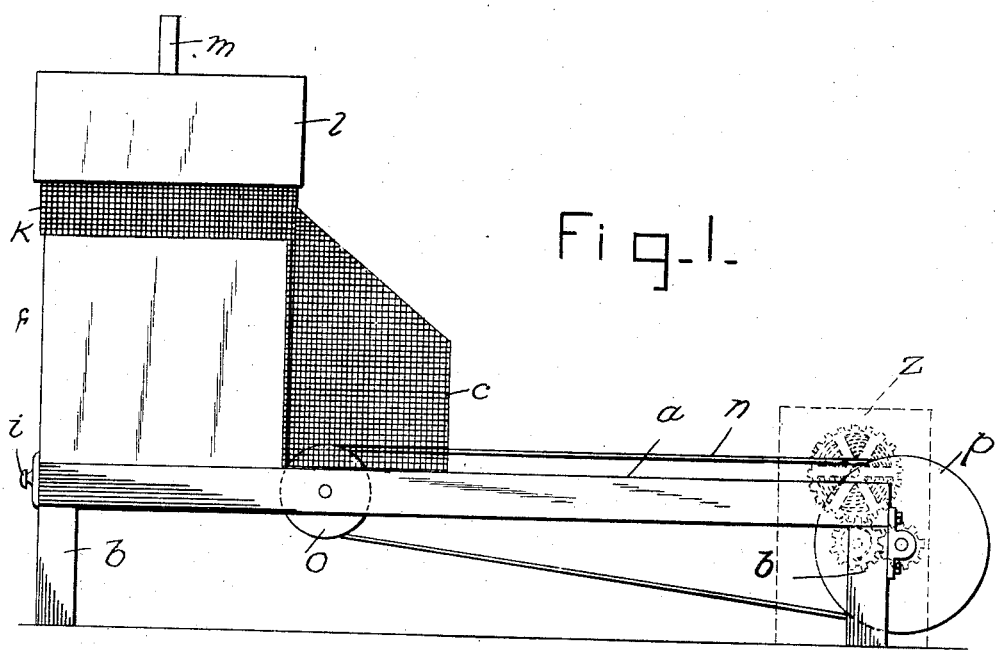
Figure 2:
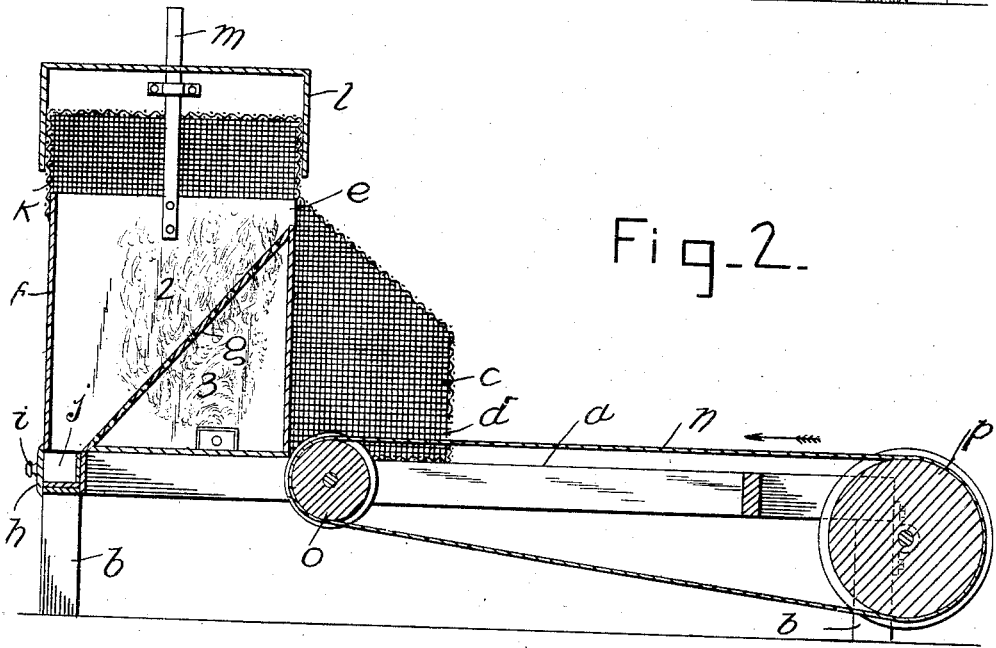

Of the said drawings—Figure 1 is a side elevation of my improved fly trap. Fig. 2 is a longitudinal sectional elevation.

Similar numerals of reference designate similar parts or features, as the case may be, whenever they occur.

In the drawings, $a$ designates a table-like support having legs $b$ upon which is arranged a cage $c$ of wire netting having an opening $d$ at its bottom and a similar opening at its top.

$f$ designates a chamber composed of tin or sheet metal and like the cage $c$ resting upon the table $a$. The chamber $f$ is divided by an inclined partition $g$ which may be made of perforated tin or other foraminous metal and extends from the lower edge of the opening $e$ down to near the other side of the chamber $f$ at its bottom. In the chamber $f$ between the point where the inclined partition $g$ is connected therewith there is formed an opening $h$ for the reception of a drawer $j$, having a handle $i$ by which it may be manipulated.

Above the chamber $f$ there is a wire cage $k$ which is adapted to be covered on its top and sides by a casing of tin or other suitable metal $l$, said covering and casing being adapted to slide up and down on a strip $m$ secured to the inner side of the chamber $f$ and extending up therefrom so that the covering and casing $l$ may be raised or lowered over the cage $k$ in order to afford greater or less outlet for gas or air from the chamber $f$.

$n$ designates an endless traveling belt formed from fly paper or other material adapted to attract flies thereon, which belt extends around a pulley $o$ inside of the cage $c$ and around another pulley $p$ outside of the cage $c$ the said pulley being adapted to be supported so as to turn in bearings secured to the leg of the table. It is proposed to employ means for operating the pulley $p$ on its shaft so that the belt may be rendered a continuously traveling device. As a means for operating the pulley $p$, I may employ an ordinary clock mechanism, as shown by dotted lines, at $z$, in Fig. 1 or an electric motor or indeed it may be operated by hand or any other suitable means, this feature forming no part of my invention.

In use, the upper portion of the belt traveling in the direction indicated by the arrow will carry any flies that light upon the upper side of the belt $n$ through the opening $d$ into the cage $c$ and after getting inside of the latter they will be disturbed as the belt turns over the pulley $o$ so as to fly upward in said cage and enter the compartment 2 of the chamber $f$ and once therein, though they may fly up into the cage $k$ they will not be likely to escape back into the cage $c$ but will be suffocated by fumes of burning sulfur in a casing $g$ in the compartment 3 of the chamber $f$, the fumes rising through the opening in the slanting partition $g$ and after the flies are suffocated, they fall down upon said inclined partition into the drawer $j$ from whence they may be removed by pulling out said drawer and opening it.

In use my invention is most efficient, while at the same time being simple in and economic of construction.

What is claimed is—

1. A fly-trap comprising a cage of woven wire having an opening at its bottom, a closed chamber having a top adapted to admit light therethrough, the said cage having an opening at its top communicating with the closed chamber, and the latter chamber being provided with a diagonally extended foraminous partition, and an endless traveling belt having a part extended through the said opening at the bottom of the cage.

2. A fly-trap comprising a cage of woven wire having an opening at the bottom, a closed chamber having an opening at its top communicating with the wire cage and provided with a diagonally extended foraminous partition, a drawer in the lower part of the chamber, and a wire cage on top of the chamber having an adjustable close cover, and an endless traveling-belt having a portion thereof extended into the first mentioned cage through the opening at its bottom.

In testimony whereof, I affix my signature, in presence of two witnesses.

GUY C. McGEE.

Witnesses:
A. G. BRUNER,
C. F. OLSON.